United States Patent
Wu et al.

(10) Patent No.: US 9,780,608 B2
(45) Date of Patent: *Oct. 3, 2017

(54) HIGH EFFICIENCY PERMANENT MAGNET MACHINE

(71) Applicants: Xinzhang Wu, Oviedo, FL (US); Hanzhou Liu, Oviedo, FL (US); Yang Hu, Oviedo, FL (US); Louis Chow, Orlando, FL (US); Jon Harms, Seminole, FL (US); Martin Epstein, Seminole, FL (US); Wei Wu, Orlando, FL (US)

(72) Inventors: Xinzhang Wu, Oviedo, FL (US); Hanzhou Liu, Oviedo, FL (US); Yang Hu, Oviedo, FL (US); Louis Chow, Orlando, FL (US); Jon Harms, Seminole, FL (US); Martin Epstein, Seminole, FL (US); Wei Wu, Orlando, FL (US)

(*) Notice: Subject to any disclaimer, the term of this patent is extended or adjusted under 35 U.S.C. 154(b) by 275 days.

This patent is subject to a terminal disclaimer.

(21) Appl. No.: 14/449,208

(22) Filed: Aug. 1, 2014

(65) Prior Publication Data

US 2014/0340011 A1    Nov. 20, 2014

Related U.S. Application Data

(63) Continuation of application No. 14/146,059, filed on Jan. 2, 2014, now Pat. No. 8,829,742.

(Continued)

(51) Int. Cl.
*H02K 21/16* (2006.01)
*H02K 1/16* (2006.01)
(Continued)

(52) U.S. Cl.
CPC ............... *H02K 1/16* (2013.01); *H02K 1/274* (2013.01); *H02K 3/12* (2013.01); *H02K 3/28* (2013.01);
(Continued)

(58) Field of Classification Search
CPC .............................. H02K 1/146; H02K 1/278
(Continued)

(56) References Cited

U.S. PATENT DOCUMENTS 8,227,948 B1 * 7/2012 Fox ................. H02K 1/06
                                                        310/50
2001/0033116 A1 * 10/2001 Rose, Sr. ............... H02K 3/28
                                                        310/180

(Continued)

*Primary Examiner* — Terrance Kenerly
(74) *Attorney, Agent, or Firm* — Nicholas Pfeifer; Smith & Hopen, P.A.

(57) ABSTRACT

The present invention is a high efficiency permanent magnet machine capable of maintaining high power density. The machine is operable over a wide range of power output. The improved efficiency is due in part to copper wires with a current density lower than traditional designs and larger permanent magnets coupled with a large air gap. In a certain embodiment wide stator teeth are used to provide additional improved efficiency through significantly reducing magnetic saturation resulting in lower current. The machine also has a much smaller torque angle than that in traditional design at rated load and thus has a higher overload handling capability and improved efficiency. In addition, when the machine is used as a motor, an adaptive phase lag compensation scheme helps the sensorless field oriented control (FOC) scheme to perform more accurately.

19 Claims, 12 Drawing Sheets

Related U.S. Application Data

(60) Provisional application No. 61/748,998, filed on Jan. 4, 2013, provisional application No. 61/803,993, filed on Mar. 21, 2013.

(51) Int. Cl.
*H02K 1/27* (2006.01)
*H02K 3/12* (2006.01)
*H02K 3/28* (2006.01)
*H02K 21/14* (2006.01)
*H02P 6/182* (2016.01)
*H02P 6/15* (2016.01)

(52) U.S. Cl.
CPC .............. *H02K 21/14* (2013.01); *H02K 21/16* (2013.01); *H02P 6/153* (2016.02); *H02P 6/182* (2013.01); *H02K 2213/03* (2013.01)

(58) Field of Classification Search
USPC ...................................... 310/52, 261.1, 254.1
See application file for complete search history.

(56) References Cited

U.S. PATENT DOCUMENTS

| | | | |
|---|---|---|---|
| 2002/0130565 A1* | 9/2002 | Tilton | H02K 5/18 310/58 |
| 2010/0133940 A1* | 6/2010 | Grossmann | H02K 1/278 310/156.46 |
| 2011/0227424 A1* | 9/2011 | Yoshida | B22F 3/24 310/15 |

* cited by examiner

HIGH EFFICIENCY PERMANENT MAGNET MACHINE

CROSS-REFERENCE TO RELATED APPLICATIONS

This nonprovisional application is a continuation of and claims priority to nonprovisional application No. 14/146,059 entitled "HIGH EFFICIENCY PERMANENT MAGNET MACHINE," filed Jan. 2, 2014, which in turn claim priority to provisional application No. 61/748,998, entitled "HIGH EFFICIENCY LOW SPEED PERMANENT MAGNET MACHINE," filed Jan. 4, 2013, and to provisional application No. 61/803,993 entitled "HIGH EFFICIENCY PERMANENT MAGNET MACHINE," filed Mar. 21, 2013.

BACKGROUND OF THE INVENTION

1. Field of the Invention

This invention relates, generally, to electrical machines. More specifically, it relates to a high efficiency electrical motor or generator.

2. Brief Description of the Prior Art

Electrical motors and generators are machines capable of converting electrical energy into mechanical energy and converting mechanical energy into electrical energy, respectively. These electrical machines have many similarities and can often be operated as either an electrical generator or motor.

Known electrical machines include a rotor, a stator, a plurality of electrical windings, and a plurality of permanent magnets. The rotor is a generally cylindrical shape with an outer circumference and an axial bore creating an inner circumference. The inner circumference is adapted to receive a shaft such that the two may rotate as one. The outer circumference of the rotor contains a plurality of permanent magnets (PMs) disposed longitudinally parallel to the axis of rotation or central axis of the rotor in a preferably generally uniform and concentric manner.

Current stator designs have a generally cylindrical shape with an outer circumference and a predetermined number of teeth projecting, a predetermined distance, inwardly towards the longitudinal axis of the stator. The teeth create a discontinuous inner circumference allowing the rotor and PM assembly to be disposed within the stator such that the rotor assembly is freely rotatable within the inner circumference of stator. Between each tooth is a stator slot having predetermined shape and size adapted to receive electrical windings. Electrical windings are typically strands of conductive materials, such as copper or aluminum, which are arranged into coil groups around the stator teeth. The electrical windings interact with the PMs to produce either mechanical or electrical energy. When configured as a motor, the electrical machine uses current flowing through the electrical windings to generate rotating magnetic fields which interact with the PMs attached to the rotor and cause the rotor and shaft to rotate. When configured as a generator, the PMs, and their respective magnetic fields, are rotated and interact with the electrical windings to produce electricity.

In recent years, the push towards green energy has increased the demand associated with developing efficient electric machine technology. The U.S. Department of Energy estimates that electric motors in the U.S. consume more than half of all electrical energy in the states. Therefore, improving the efficiency of these electric machines will greatly decrease the United States' carbon footprint.

Currently, some commercial off-the-shelf electric motors are designed for high efficiency, but have power densities on the order of only 0.1 horse power per pound (HP/lb.). Electric motors developed for use in aircraft propulsion (small unmanned aerial vehicles), on the other hand, have power densities between 1 and 2 HP/lb., while direct-drive electric motors can attain power densities greater than 5 HP/lb. only through increased operating speeds.

Traditionally in electric machine applications, the higher the electric machine's efficiency, the less energy wasted and the easier the thermal management system; however, the efficiency generally comes at the cost of increased size and weight. Copper loss is the term often given to heat produced by electrical currents in the conductors of transformer windings, or other electrical devices. Copper losses are an undesirable transfer of energy, as are core losses, which result from induced currents in adjacent components. Copper loss is the most significant in all the losses in electric machines, so reducing the copper loss is the key to building highly efficient machines. It is known that copper loss is inversely proportional to the wire's cross-sectional area. Therefore, copper wires having a greater cross-sectional area (large diameter) and lower current density will also require a larger slot area. The larger slot area requires the stator size to increase or tooth size to decrease. If the stator size increases, the machine becomes larger and the power density decreases. If the tooth size decreases, the magnetic saturation increases, and so the current must increase resulting in decreased efficiency.

Accordingly, what is needed is a highly efficient scalable permanent magnet machine having relatively high power density while being capable of operating at a wide range of power outputs. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a more efficient permanent magnet electric machine is now met by a new, useful, and nonobvious invention.

The novel structure includes a laminated cylindrical rotor and a laminated cylindrical stator enclosed in a housing. The rotor has an axial bore adapted to receive a shaft and an outer circumference adapted to receive a plurality of permanent magnets. Each permanent magnet has a magnetic flux density between 70 and 95 percent of a residual magnetic flux density of the rotor's permanent magnet material.

The stator includes an outer circumference, a slot pitch, a longitudinal axis, and plurality of teeth projecting a predetermined distance inwardly towards the longitudinal axis of the stator. The teeth create a discontinuous inner circumference allowing the rotor to be disposed within the stator such that a central axis of the rotor aligns with the stator's longitudinal axis. The rotor is freely rotatable within the inner circumference of stator. The stator also includes stator slots of predetermined shape and size disposed between each tooth and adapted to receive a predetermined number of strands of conducting material to form an electrical winding around each tooth.

An air gap exists between the outer circumference of the rotor and the inner circumference of the stator when the rotor is disposed within the stator, such that the air gap is inversely proportional to the torque angle of the machine. The torque angle is between about 2 and about 10 degrees, which is significantly less than the standard, and is proportional to the thickness of the permanent magnets.

Additionally, the electrical machine includes a predetermined number of poles, where the number of poles is directly proportional to the electrical frequency of the electric machine and inversely proportional to a number of required coil windings. The present invention utilizes a three phase electrical winding scheme where each phase has two groups and each group includes two coils connected in series. The windings are comprised of strands of conducting material having a cross-sectional area that is related to current density with the preferred current density ranging between about 3 and about 8 Amp/mm$^2$.

In a certain embodiment the stator teeth each have a generally uniform width, wherein the magnitude of the width is between about 60 and about 80 percent of the magnitude of the slot pitch. This design feature provides decreased magnetic saturation and therefore increased efficiency.

In a certain embodiment the present invention may utilize a sensorless field oriented control, where a rotor angle is estimated by a sliding mode observer and the sliding mode observer module contains a first order low-pass filter for back electromotive force estimation. In such an embodiment a phase lag compensation value, that is automatically calculated based on rotational speed of the rotor, is applied to feedback resulting in increased accuracy of the field oriented control.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
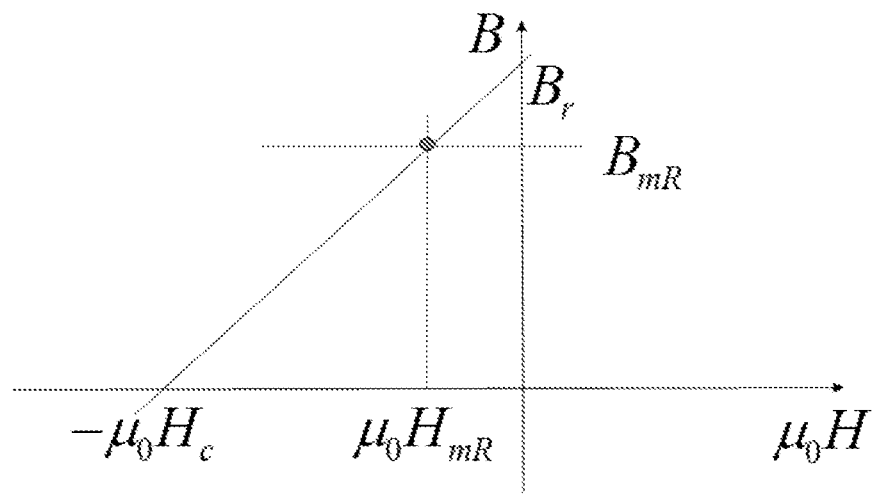
FIG. 1 depicts an exemplary B-H curve.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

The present invention is a high efficiency electrical machine operable as a motor or generator. The electrical machine includes a rotor, a stator, a plurality of electrical windings, and a plurality of permanent magnets all contained in a housing. The rotor has a generally cylindrical shape with an outer circumference and an axial bore creating an inner circumference. The inner circumference is adapted to receive a shaft such that the two may rotate as one. The outer circumference of the rotor contains a plurality of permanent magnets (PMs) disposed longitudinally parallel to the axis of rotation or central axis of the rotor in a preferably generally uniform and concentric manner. In a certain embodiment the PM's are arranged in a manner such that the outward radially facing magnetic poles are alternating in orientation between each PM.

The stator has a generally cylindrical shape with an outer circumference and a predetermined number of teeth projecting, a predetermined distance, inwardly towards the longitudinal axis of the stator. The teeth create a discontinuous inner circumference allowing the rotor and PM assembly to be disposed within the inner circumference of the stator such that the rotor assembly is freely rotatable within the inner circumference of stator. Between each tooth is a stator slot of predetermined shape and size adapted to receive a predetermined number of, preferably copper, conducting strands or wires to form a winding around a predetermined number of teeth.

The present invention utilizes a design providing decreased copper loss and decreased windage loss to improve the overall efficiency of the electrical machine. In order to decrease copper loss, the present invention uses copper wires having a larger diameter than traditional designs. The wires have a diameter related to current density as shown in the equation below:

$$J = \frac{4I}{\pi d^2} \quad (1)$$

As shown in equation 1, low current density will result in large wire diameter which will reduce the copper loss since the copper loss is inversely proportional to the wire's cross-sectional area. The preferred value of current density is in the range of 3 to 8 Amp/mm$^2$. In electrical machine design, winding current density is an important factor. Due to the heat dissipation limitation, current density must not exceed a certain value, otherwise the motor will overheat. For air cooling, the current density is usually lower than 8 A/mm$^2$ and the current density has such a relationship with the wire diameter as seen in equation (1). So, under the same current, larger wire diameter could result in a lower current density which provides the motor with more overload capability (capable of operating with a higher current), and less heat stress. Additionally, to reduce the eddy current effects and proximity effects resulting in increased efficiency, a certain embodiment may utilize a known stranded Litz wire instead of solid wire.

Although a thicker wire requires a larger stator slot area, a highly efficient machine generates much less heat and therefore does not need to use any active cooling methodologies (such as fan, liquid cooling or spray cooling); and hence the overall power density of the whole system (including cooling devices) may not decrease much. A passive cooling mechanism, such as fins on the machine's outside housing, is sufficient when the efficiency is high. In a certain embodiment, the housing may contain a passive cooling mechanism or an active cooling mechanism, depending on the application of the electrical machine.

In order to counteract the need to increase the slot area to account for larger wires, the number of turns in each coil, or in other words the amount of wire in the slot area, is decreased. However, decreasing the number of turns per coil requires higher electrical frequency. The electrical frequency depends on the number of rotor pole pairs (PP) and mechanical frequency (MF) of the rotor as shown in the equation below:

$$EF = PP \times MF \quad (2)$$

The electrical frequency is not exactly a constant when the motor runs. Instead a motor is typically driven using a motor drive system, which provides electrical frequency specified by a controller. For example, in an application for truck APU, the motor speed is almost a constant. If using a large number of pole pairs, the electric frequency will increase. The number of turns per coil for the stator winding is inversely proportional to the electric frequency as shown below in equation 3.

$$N_c = \frac{1.1 V_{\phi rated}}{2\sqrt{2} \, \pi f_e n k_w B_m D l} \quad (3)$$

Where $N_c$ is the effective turns per coil, $V_{\phi rated}$ is phase voltage, $f_e$ is electrical frequency, n is number of group windings per pole, $k_w$ is the back EMF due to stator pitch, $B_m$ is a sum of residual magnetic flux density, D is the diameter of the motor, and l is the length of the motor.

Thus, with higher electric frequency, a lower number of coil turns suffices, therefore leading to smaller slot areas. Ultimately, an increase in the number of pole pairs, resulting in increased electrical frequency, allows the present invention to utilize a decreased number of turns per coil, thus resulting in a smaller required slot area and preventing the need to increase the overall size of the machine.

The preferred embodiment of the present invention uses 8 to 16 rotor poles when the intended mechanical speed is less than 3,000 revolutions per minute. Although the present invention may seem to use a comparatively large slot area for a low speed machine, when the electrical frequency is increased, the number of turns decreases, and the slot area required can be comparable to that of a 2 to 6 pole design utilizing a smaller diameter copper wire.

Moreover, the design utilizes a smaller torque angle, a large air gap and large PM's to increase efficiency. Traditionally, the high cost of PM's has led innovators to develop electric machines with small PM's ultimately forcing the design to contain a small air gap (0.5 mm-10 mm). However, a small air gap leads to a higher windage loss (shear forces on the air between the rotor and stator), which results in less efficient electric machines. To avoid demagnetization the present invention utilizes a $B_{mR}$ (the magnetic flux density from the rotor PM's) between about 70 and 95 percent of Br (the residual magnetic flux density of the permanent magnet material on the rotor). Then, using the material's B-H curve as shown in FIG. 1, $H_{mR}$ (the magnetic field intensity in the PM's) is determined. The following equation represents the relationship between the size of the air gap and the size of the PM's when the total magnetomotive force (MMF) in the loop is zero.

$$g_{eff} B_{mR} + \mu_0 H_{mR} l_m = 0 \quad (4)$$

Where $g_{eff}$ is effective air gap, which is proportional to the real air gap, and $l_m$ is the PM thickness. Because $B_{mR}$ and $H_{mR}$ have a certain relationship and can be considered constant for a particular design, and $H_{mR}$ is negative (See FIG. 1), it is apparent that the air gap and PM thickness are proportional.

Figure 2A:
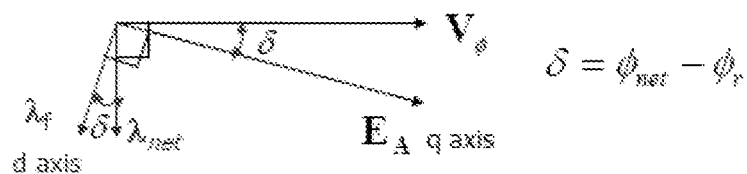
FIG. 2a depicts a phasor diagram illustrating torque angle between induced voltage $E_A$ and terminal voltage $V_\phi$ and between net flux $\lambda_{net}$ and rotor flux $\lambda_f$.

Torque angle is also related to air gap and therefore permanent magnet size. Traditional electric machines utilize a torque angle between about 15 and 30 degrees at the machine's rated power and speed. The present invention uses a much lower torque angle of 2 to 10 degrees at rated power and speed. Torque angle is δ as shown in FIG. 2a, and can be represented as the angle between the induced voltage $E_A$ and terminal voltage $V_\phi$ or the angle between net flux $\lambda_{net}$ direction (total flux, which is the result of interaction between flux from winding excitation and rotor flux) and the rotor flux $\lambda_f$ direction. The torque angle can also be seen as the angle that the rotor poles lags behind the rotating field.

When torque angle is 0 degrees, there is no torque, but at 90 degrees, the torque is at its maximum. However if the torque angle goes over 90 degrees, the motor will lose synchronization and stop. When the motor is running at a small torque angle at rated load, it has more room and potential to provide more torque if needed (when the load torque increases, the motor will have a larger torque angle for compensation and try to produce more torque output). However, torque angle needs to be kept at a certain range because if it increases too much there is danger of losing synchronization. Therefore, having the motor running at a small torque angle for rated power, means it has better overload power handling capability and efficiency.

Figure 2B:
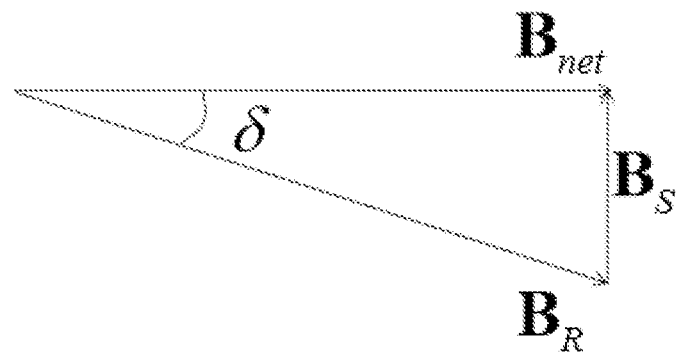
FIG. 2b depicts a phasor diagram illustrating the relationship between torque angle and magnetic flux density.

As shown in FIG. 2b, the magnetic flux density from the rotor ($B_R$) and the magnetic flux density in the stator armature ($B_S$) have the following relationship:

$$B_S = B_R \sin \delta \quad (5)$$

Where $B_{mR}$ (which is $B_R$ in this equation) is determined when the working point is chosen and can be considered as a constant in a particular design. Therefore, a small torque angle δ will result in a smaller $B_S$. Additionally, the magnetic flux density generated from the armature windings has a relationship with air gap as shown below.

$$\hat{g}_{total} = \frac{4}{\pi} \frac{\mu_0}{B_{a,pk}} \frac{\hat{N}_a}{P} 1.5\sqrt{2} \, I_{A,rated} \quad (6)$$

Where $\hat{g}_{total}$ is the effective total airgap, $\hat{N}_a$ is effective number of series turns per phase of armature winding, P is the number of rotor poles, $I_{A,rated}$ is the rated phase current, $\mu_0$ is a vacuum permeability constant, and $B_{a,pk}$ is the $B_S$ described above. Equation (6) proves that a smaller $B_{a,pk}$ will result in a larger air gap. Therefore, smaller torque angle will lead to a smaller $B_S$, which results in a larger air gap.

The present invention's use of a small torque angle between about 2 degrees and about 10 degrees, a large air gap based on the torque angle from equations (5-6), and large PM's based on the air gap from equation (4). The large air gap, as accentuated in FIGS. 7-10, helps to reduce the windage loss and noise level, while increased PM thickness helps to avoid demagnetization.

In a certain embodiment, the present invention utilizes a sensorless field oriented control (FOC), where the rotor angle is estimated by a sliding mode observer (SMO). The SMO module contains a first order low-pass filter for back EMF estimation. However, this low pass filter will cause a delay in the estimated angle. Rotor angle is a critical parameter in FOC control: to accurately achieve FOC control, compensation is made to the estimated angle. The phase lag differs at different speeds, and therefore, the compensation must be adaptive. The angle delay may be calibrated at different speeds utilizing a function to interpolate the delay angle vs. speed curve. The appropriate phase lag compensation value is automatically calculated based on the speed of the motor and applied to the feedback. This adaptive phase lag compensation increases the accuracy of the control.

In an embodiment of the invention intended for use in electrical machines operating at mechanical speeds of greater than 3,000 rpm, a lower number of rotor poles than specified above may be preferable. For an electrical machine that operates at speeds greater than 6,000 rpm, 2-12 poles are sufficient. Alternative embodiments may involve more poles for electrical machines intended to operate at lower speeds. When the mechanical speed is high, less poles are preferred because of the mechanical strength of the rotor.

A certain embodiment may employ a laminated stator and/or a laminated rotor, such that both are made of laminated sheets held together by an adhesive having thermal insulation properties. Such a design reduces the need to have additional internal cooling devices to prevent the electric machine from overheating. The laminated design also provides the additional known benefit of reducing eddy currents.

EXAMPLE 1

Figure 3:
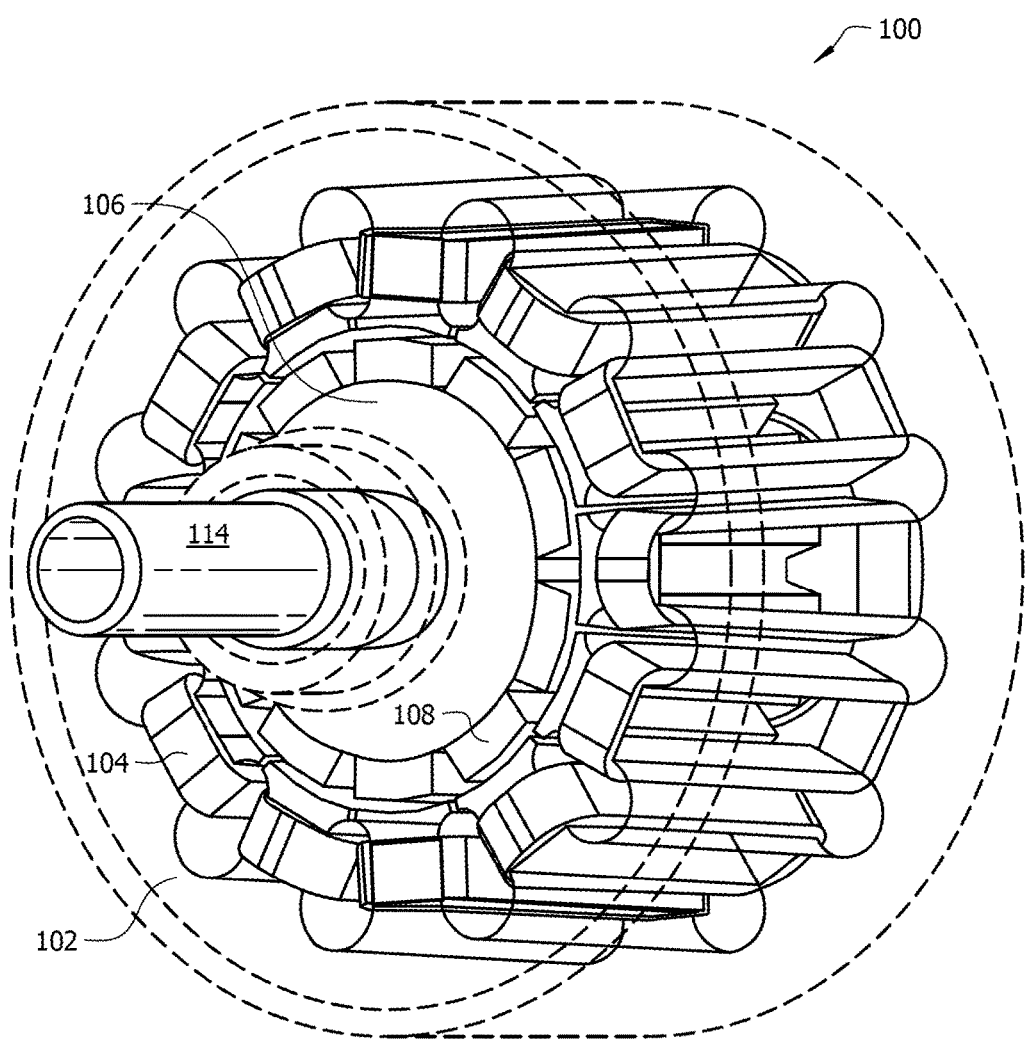
FIG. 3 is a perspective view of a first embodiment of the present invention.
Figure 4:
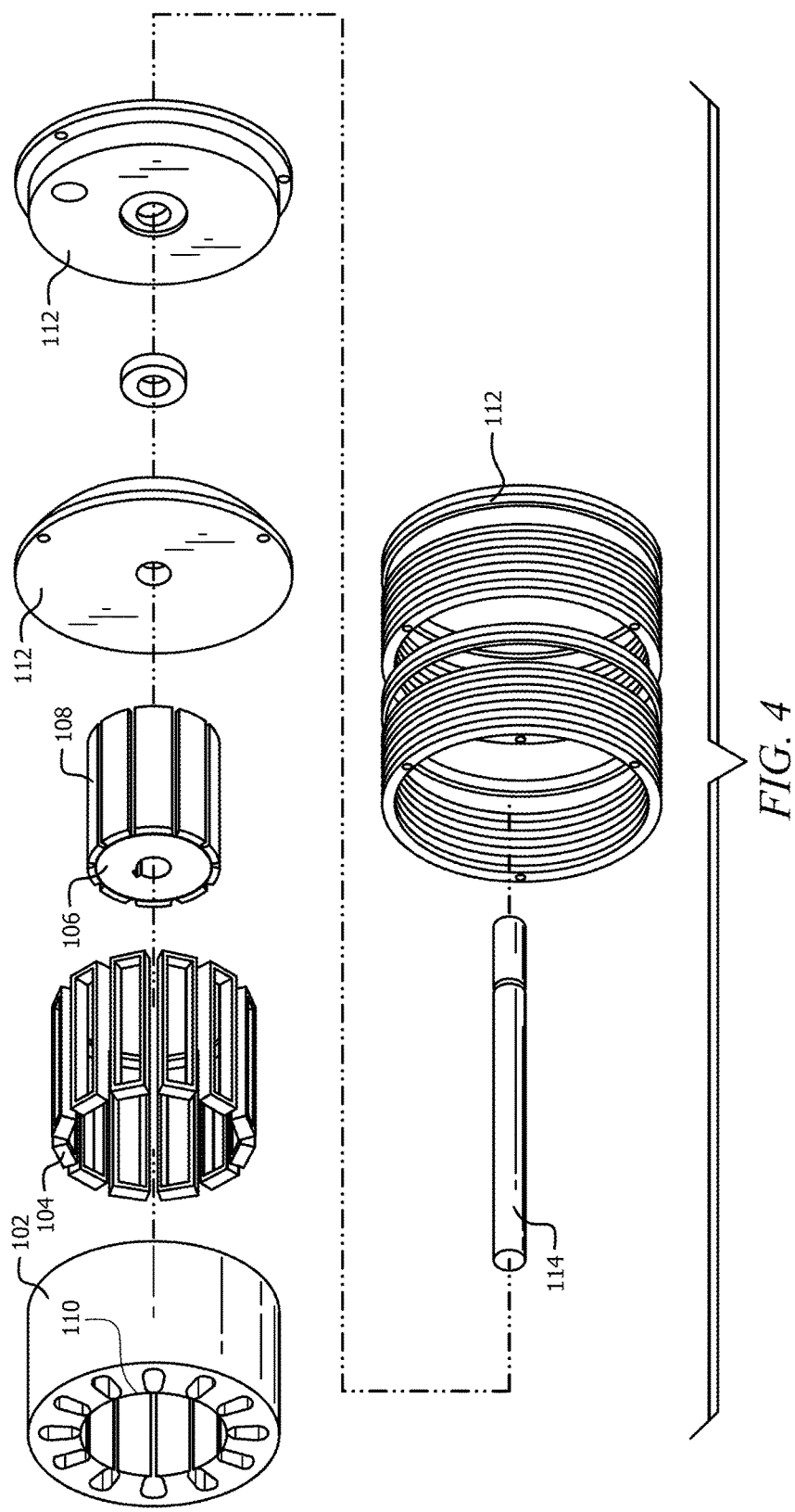
FIG. 4 is an exploded view of the first embodiment in FIG. 3.

As shown in FIG. 3, a certain embodiment, generally denoted as reference numeral 100, of the present invention is a high efficiency electrical motor having shaft 114, laminated stator 102, and laminated rotor 106 all contained within housing 112. Laminated stator 102 contains a plurality of windings 104, and laminated rotor 106 contains a plurality of permanent magnets 108. Rotor 106 is disposed within the inner circumference of stator 102 such that the longitudinal axis of stator 102 is aligned with the central axis of rotor 106 and rotor 106 is freely rotatable within stator 102. Stator 102 has a plurality of stator teeth 110 and a plurality of stator slots wherein each stator slot is disposed between two stator teeth 110. Windings 104 are positioned around each tooth 110 passing through stator slots on either side of each respective tooth 110. Windings 104 are illustrated in the figures as having a rectangular shape for clarity purposes. The windings, being composed of multiple strands of conducting material would be difficult to illustrate in the figures as they actually exist with proper clarity.

As shown in FIGS. 3, 4, 7, and 9, stator 102 has been designed to further reduce copper loss by using wider teeth 110. Since the copper loss is proportional to the current squared, reducing the current is an effective way to reduce copper loss and improve efficiency. The current is reduced by decreasing magnetic saturation and magnetic saturation is inversely related to tooth width. So the width of the stator teeth was increased to decrease magnetic saturation, in turn decreasing current, and ultimately decreasing copper loss. Teeth 110 have a width preferably in the range of 60% to 80% of the stator's slot pitch. Slot pitch is a circumferential distance along the inner circumference of the stator from the center line of one tooth or slot to the center line of the adjacent tooth or slot. Traditional electric machine designs utilize stator teeth having widths of about 40% to 60% of the slot pitch resulting in greater magnetic saturation and less efficiency than the present invention.

A certain embodiment of the motor may implement a winding scheme having 3 phases (A, B, C) with each phase having two groups and each group including two coils connected in series. For example, a stator having 12 stator slots, 3 phases, and two groups per phase would have coils arranged as shown in Table 1 below.

TABLE 1

Winding table illustrating a concentric winding scheme for a 12 slot stator.

| Slot Number | Phase A | Phase B | Phase C |
|---|---|---|---|
| 1 | In | | Out |
| 2 | Out & Out | | |
| 3 | In | Out | |
| 4 | | In & In | |
| 5 | | Out | In |

TABLE 1-continued

Winding table illustrating a concentric winding scheme for a 12 slot stator.

| Slot Number | Phase A | Phase B | Phase C |
|---|---|---|---|
| 6 | | | Out & Out |
| 7 | Out | | In |
| 8 | In & In | | |
| 9 | Out | In | |
| 10 | | Out & Out | |
| 11 | | In | Out |
| 12 | | | In & In |

In an alternate embodiment, the groups may be connected in parallel as is known by a person having ordinary skill in the art.

EXAMPLE 2

Figure 5:
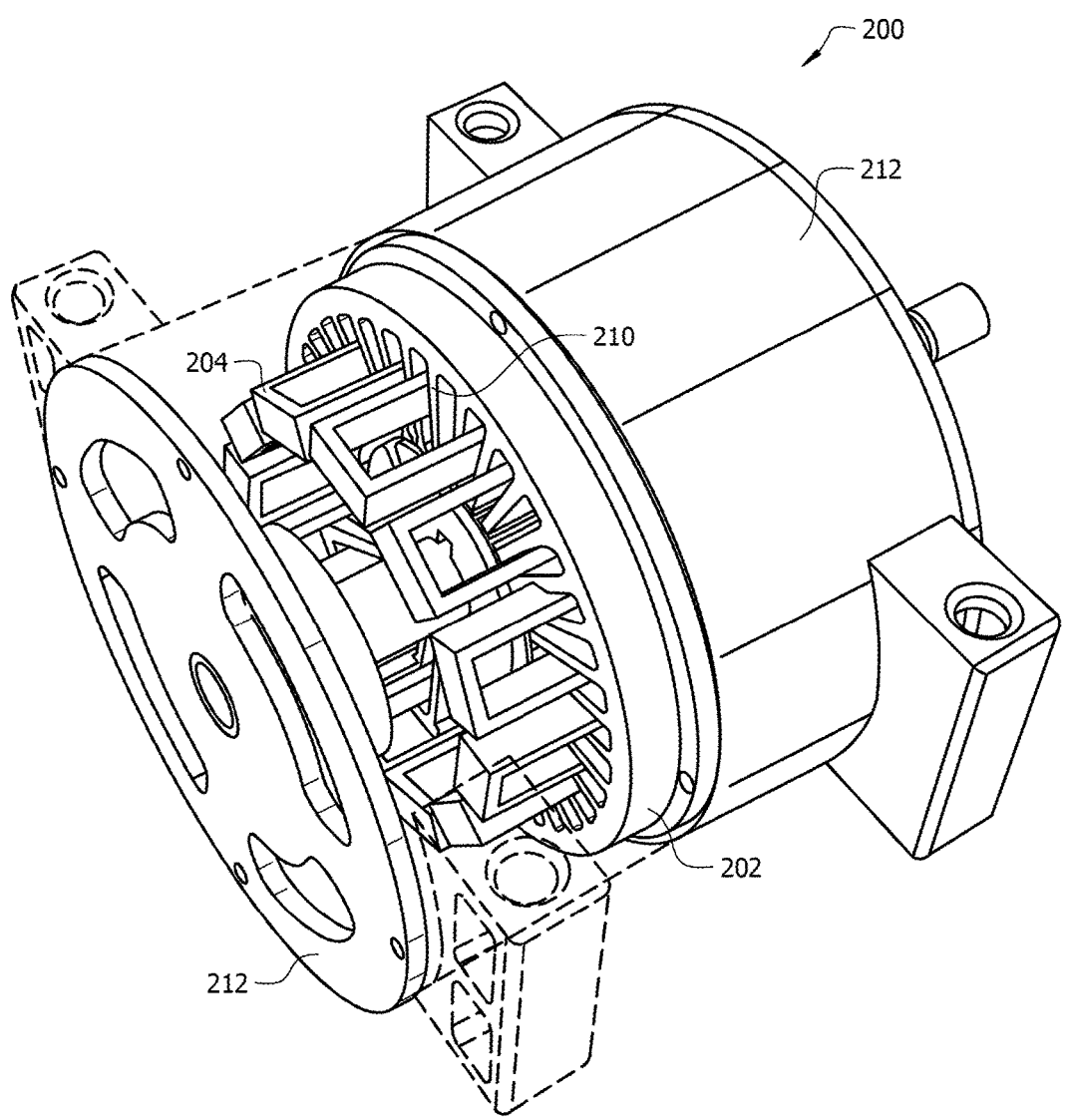
FIG. 5 is a perspective view of a second embodiment of the present invention.
Figure 6:
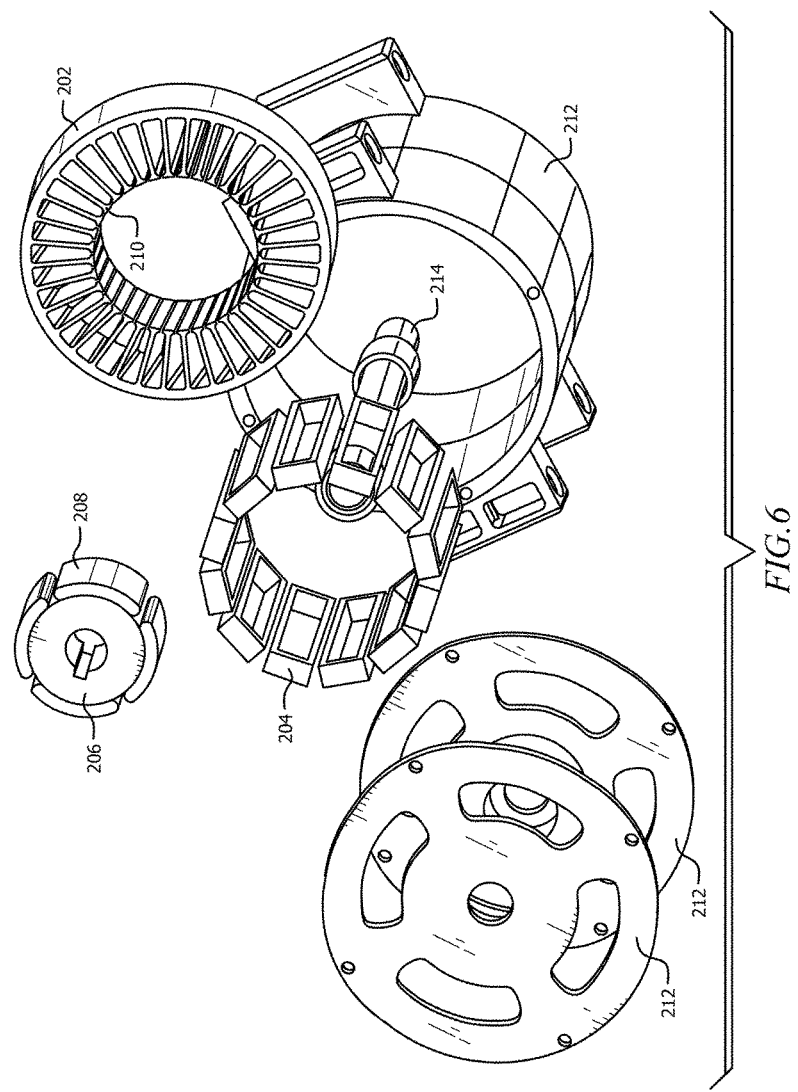
FIG. 6 is an exploded view of the second embodiment in FIG. 3.
Figure 7:
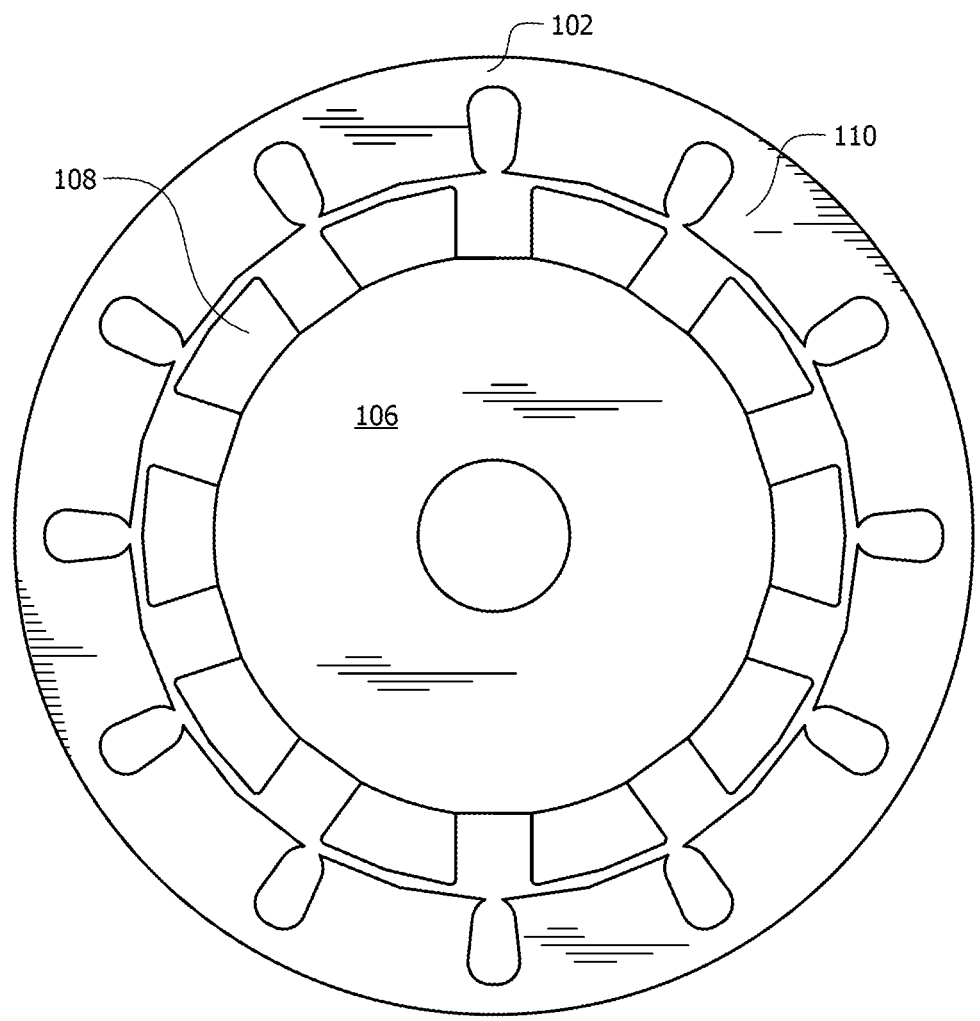
FIG. 7 is a top view the first embodiment illustrating the rotor displaced inside the stator.
Figure 8:
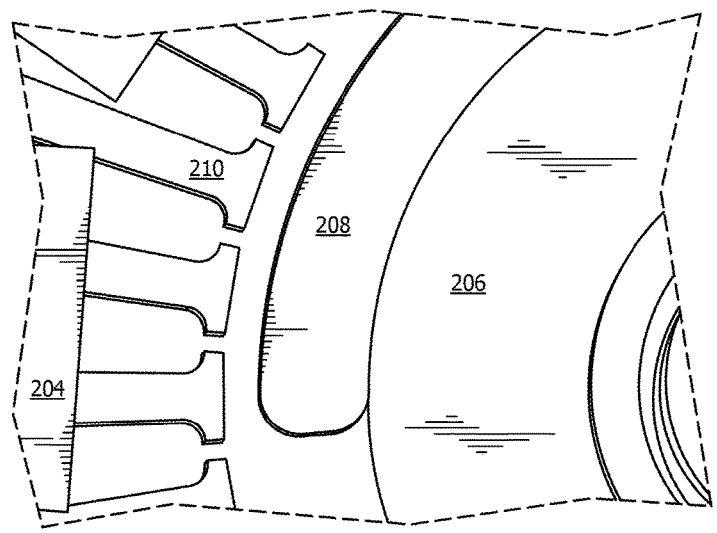
FIG. 8 is a close up view of the second embodiment illustrating the air gap between the stator teeth and the permanent magnets on the rotor.
Figure 9:
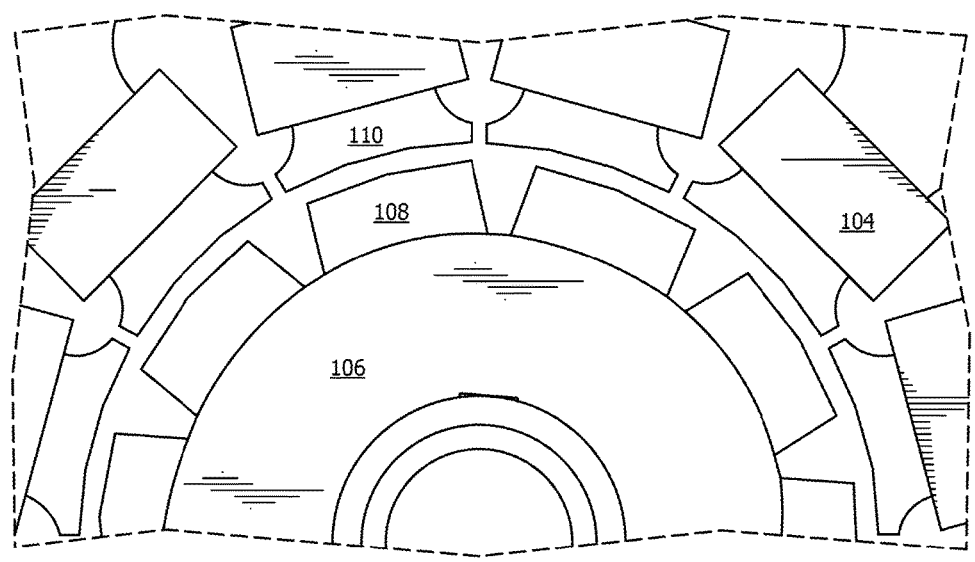
FIG. 9 is a close up view of the first embodiment illustrating the air gap between the stator teeth and the permanent magnets on the rotor.
Figure 10:
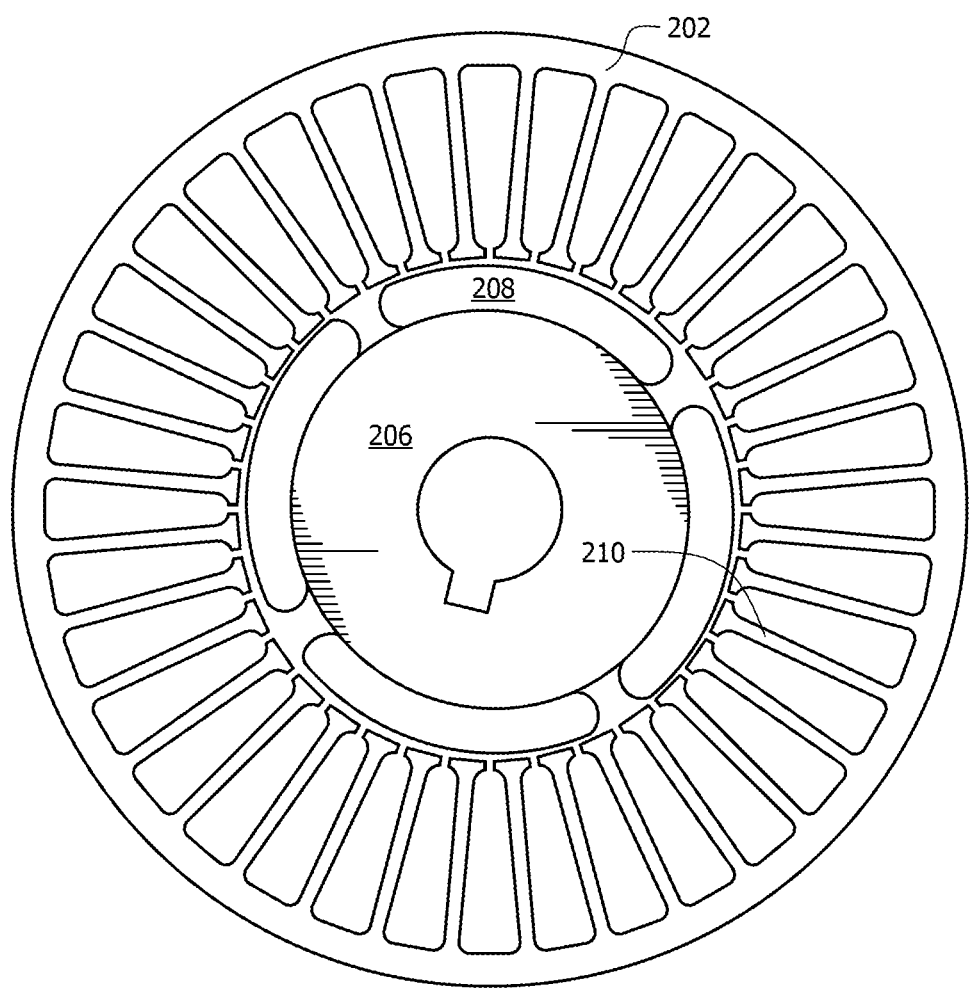
FIG. 10 is a top view the second embodiment illustrating the rotor displaced inside the stator.
Figure 11:
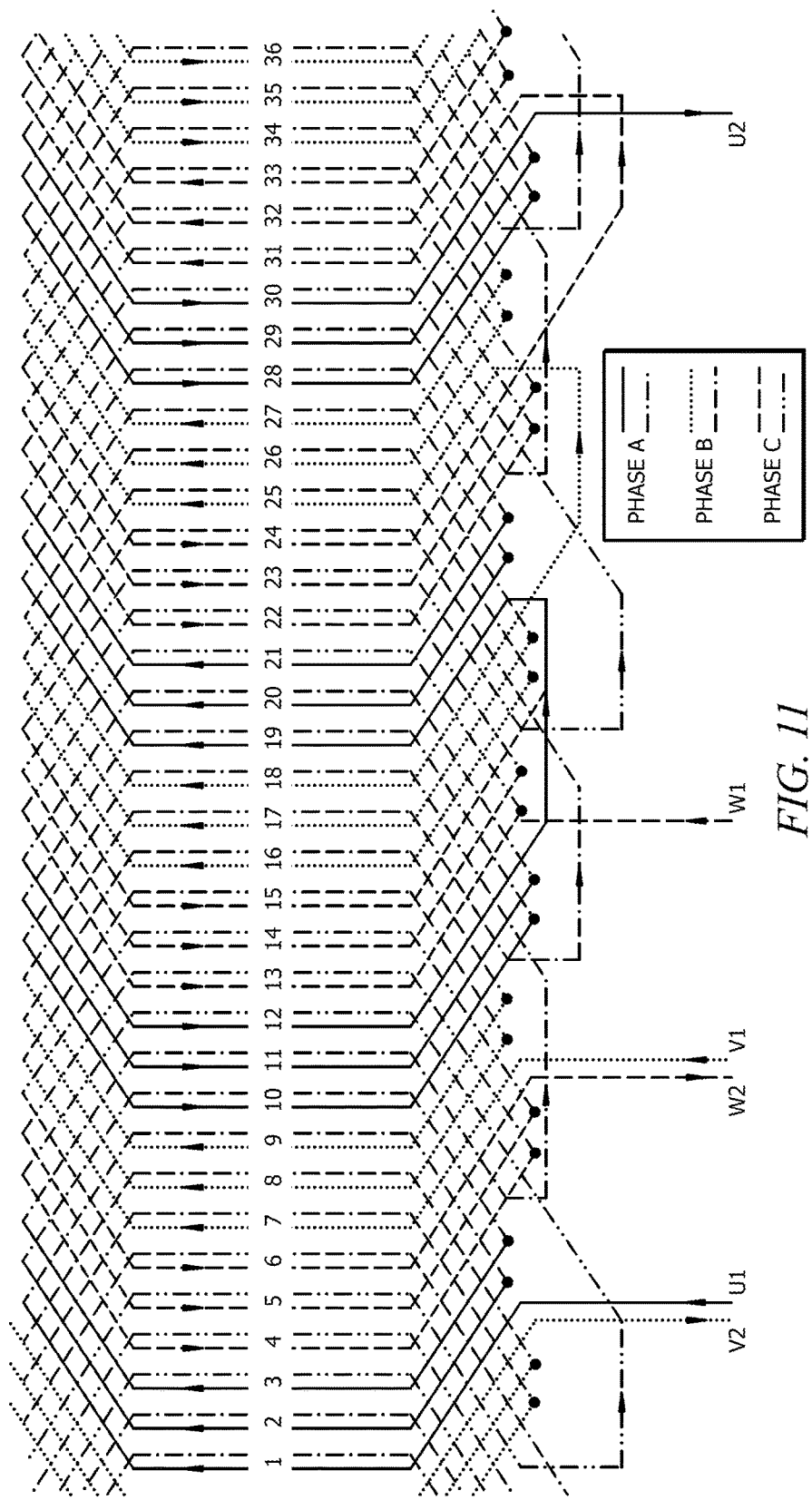
FIG. 11 depicts a winding scheme diagram of the second embodiment with the stator slots being identified by numerical indicators 1-36.
Figure 12:
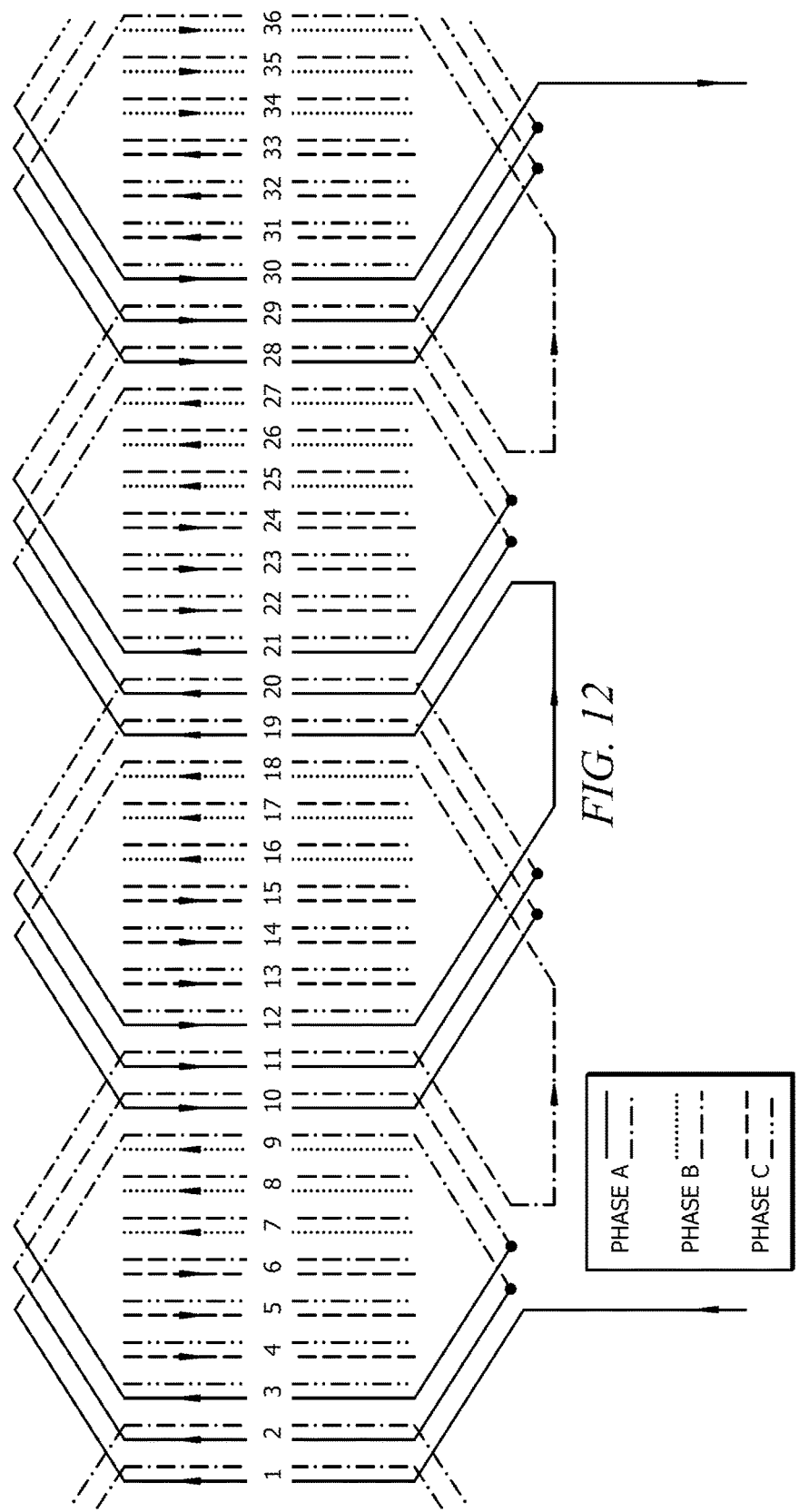
FIG. 12 emphasizes Phase A of the winding scheme diagram shown in FIG. 11.
Figure 13:
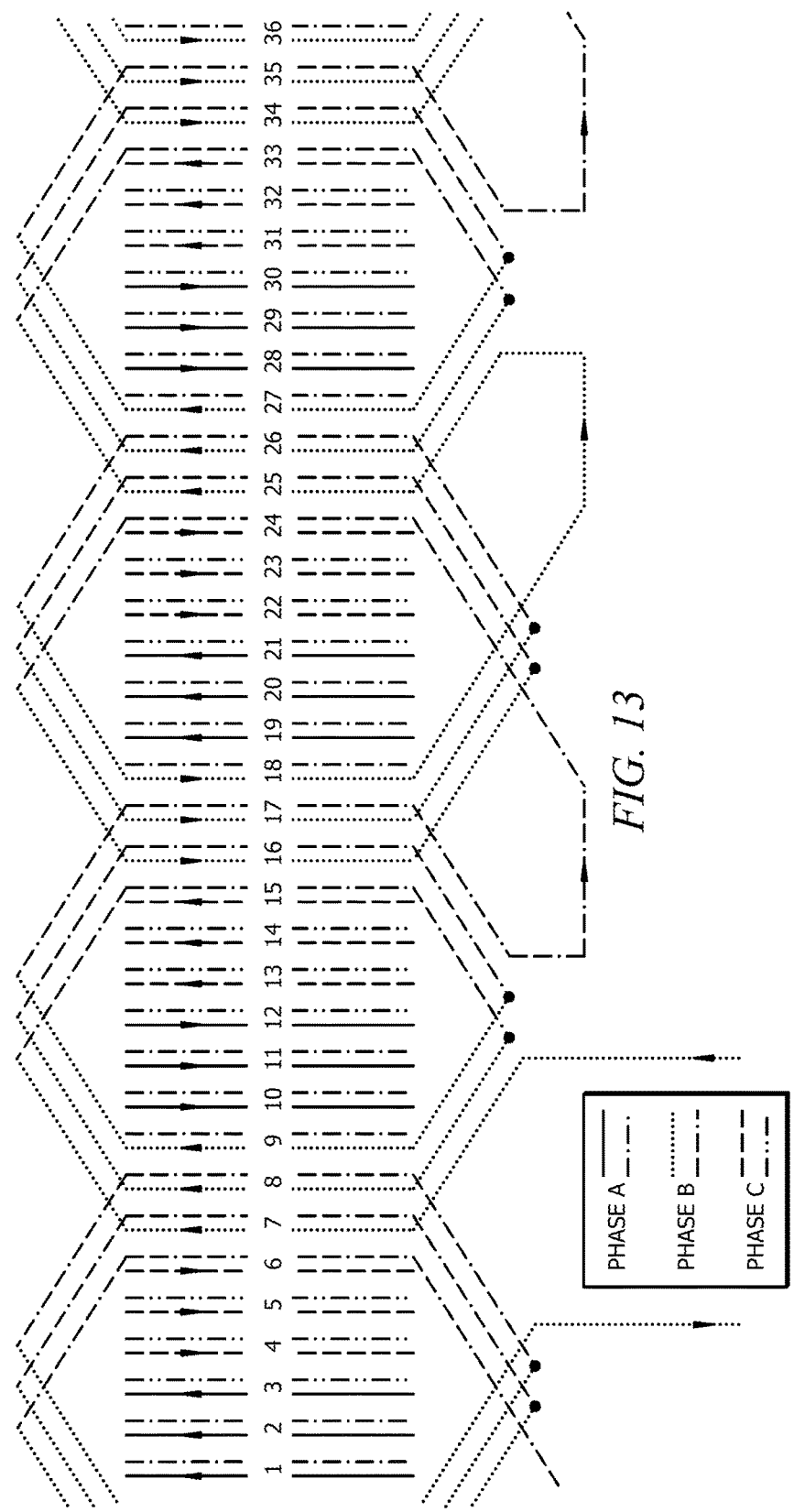
FIG. 13 emphasizes Phase B of the winding scheme diagram shown in FIG. 11.
Figure 14:
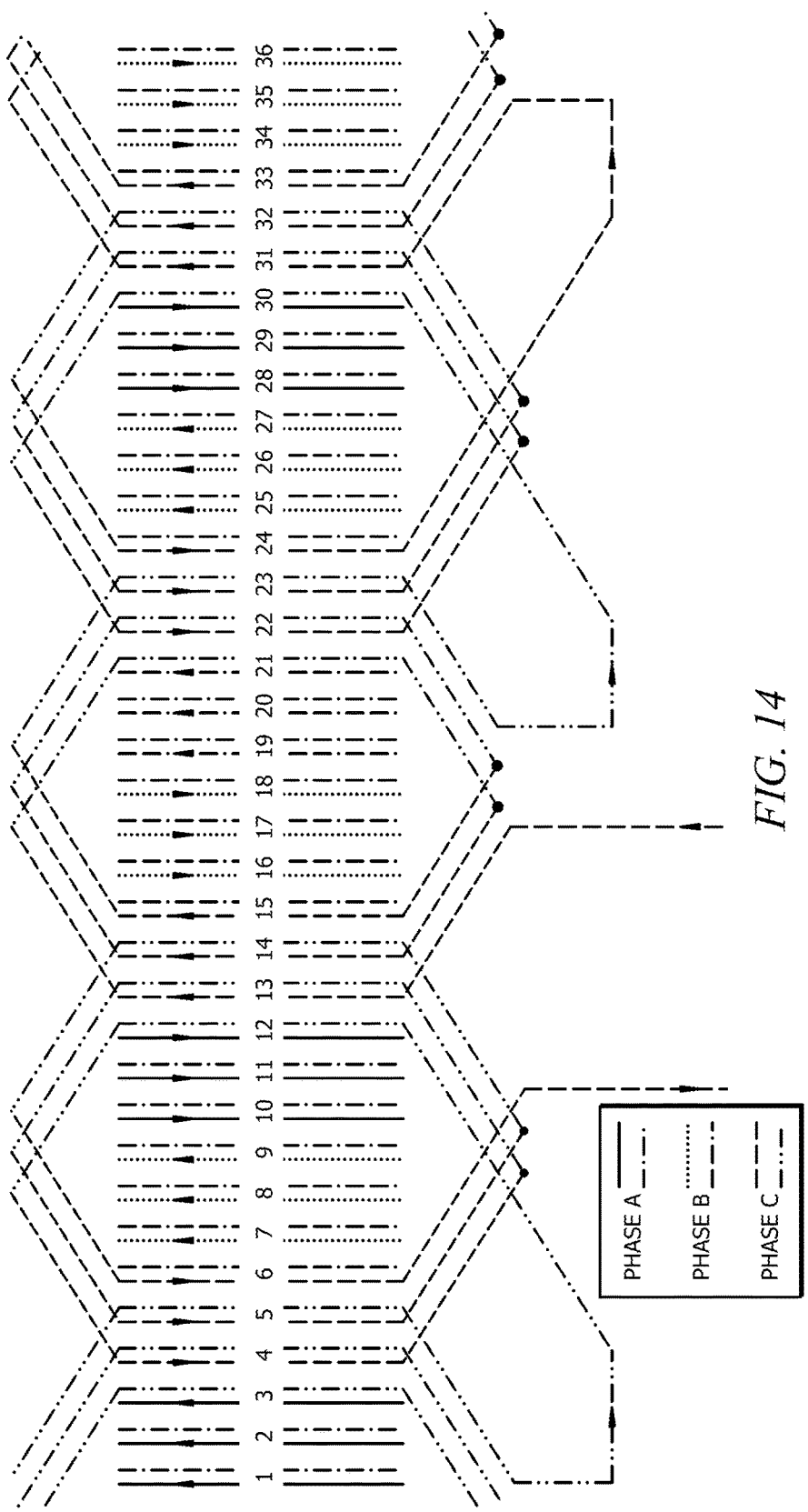
FIG. 14 emphasizes Phase C of the winding scheme diagram shown in FIG. 11.

As shown in FIG. 5, a certain embodiment, generally denoted as reference numeral 200, is a high efficiency electrical generator. Similar to the motor, the generator design includes shaft 214, stator 202, rotor 206, electrical windings 204, and PMs 208 all contained in housing 212. The rotor has four PMs 208 for use at a desired operational speed of 6,000 rpm to prevent excessive electrical frequency associated with too many rotor poles. Stator 202 is comprised of thirty six stator teeth 210 and therefore thirty six stator slots. Similar to windings 104, windings 204 are illustrated in the figures as having a rectangular shape for clarity purposes. As shown in FIG. 5, a winding encompasses two stator teeth. This illustration is simply for clarity. Embodiment 200 actually contains 2 coils per slot. FIGS. 11-14 illustrate the three phase winding diagram, in which there is 1 turn per coil, 2 coils per slot, and all the groups are connected in series. Each coil contains about 120 strands of conducting material. In an alternate embodiment, the groups may be connected in parallel as is known by a person having ordinary skill in the art.

Glossary of Claim Terms

Back Electromotive Force Estimation: is the estimation of the voltage induced in electric motors where there is relative motion between the armature of the motor and the magnetic field.

Current Density: is the electrical current per unit area of cross section

Electrical Frequency: is the number of cycles of electricity per unit of time.

Electrical Winding: is a number of strands of conducting material wound around stator teeth.

Low-Pass Filter: is a filter that passes low-frequency signals and attenuates signals with frequencies higher than the cutoff frequency.

Magnetic Flux Density: is the amount of magnetic flux per unit area taken perpendicular to the direction of the magnetic flux.

Passive Cooling Mechanism: is heat dissipation without the aid of a pump or fan.

Permanent Magnet: is a magnet that retains its magnetic properties in the absence of an inducing field or current.

Phase Lag Compensation Value: is the angle that calculated based on rotor speed and feedback loop delay. It is applied to the estimated rotor angle to increase accuracy.

Pole: point where electric or magnetic force appears to be concentrated.

Rotor: is a rotary part of a machine.

Rotor Sheet: is a thin layer of material adapted to be laminated to additional rotor sheets to form the final rotor dimensions.

Sensorless Field Oriented Control: is a sensorless variable frequency drive control method.

Sliding Mode Observer: is a non-linear high-gain observer.

Slot Pitch: is a distance between corresponding points in adjacent stator slots. It can also be expressed as an angle.

Stator Sheet: is a thin layer of material adapted to be laminated to additional stator sheets to form the final stator dimensions.

Stator Slot: is an opening between two stator teeth.

Stator Tooth Width: is a measurement of the minimum width of the tooth.

Stator: is a mechanical device consisting of the stationary part of a motor or generator in or around which the rotor revolves.

Thermal Insulating Adhesive: is a substance having a tendency to stick and the capability to reduce heat transfer between objects in thermal contact or in range of radiative influence.

Torque Angle: is the angle between the induced voltage $E_A$ and terminal voltage $V_\phi$ or the angle between net flux $\lambda_{net}$ direction (total flux, which is the result of interaction between flux from winding excitation and rotor flux) and the rotor flux $\lambda_f$ direction. The torque angle can also be seen as the angle that the rotor poles lags behind the rotating field.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An electric machine, comprising:
   a rotor, the rotor further including:
      having a cylindrical shape and a central axis;
      an axial bore adapted to receive a shaft;
      an outer circumference adapted to receive a plurality of permanent magnets comprising of permanent magnet material, wherein each permanent magnet has a magnetic flux density between 70 and 95 percent of a residual magnetic flux density of the permanent magnet material;
   a stator, the stator further including:
      having a cylindrical shape and a longitudinal axis;
      an outer circumference;
      a plurality of teeth disposed in an equidistant angular relationship, each tooth projecting inwardly toward the longitudinal axis, the teeth creating a discontinuous inner circumference configured to accept the rotor within the stator such that the longitudinal axis of stator is aligned with the central axis of the rotor and the rotor is rotatable within the inner circumference of the stator;
      a stator slot of predetermined shape and size disposed between each tooth and adapted to receive a predetermined number of strands of conducting material to form an electrical winding around at least one tooth;
   a predetermined number of poles, whereby the number of poles is directly proportional to an electrical frequency of the electric machine and inversely proportional to a number of required coil windings; and
   an air gap between the outer circumference of the rotor and the inner circumference of the stator when the rotor is disposed within the stator.

2. The electric machine according to claim 1, further comprising a current density ranging between 3 and 8 Amp/mm2.

3. The electric machine according to claim 1, further comprising a torque angle between 2 and 10 degrees.

4. The electric machine according to claim 1, further comprising a three phase electrical winding scheme where each phase has two groups and each group includes two coils connected in series.

5. The electric machine according to claim 1, further comprising the rotor having a plurality of rotor sheets affixed to one another by a thermal insulating adhesive disposed between adjacent rotor sheets.

6. The electric machine according to claim 1, further comprising the stator having a plurality of stator sheets affixed to one another by a thermal insulating adhesive layer disposed between the adjacent stator sheets.

7. The electric machine according to claim 1, further comprising a sensorless field oriented control, where a rotor angle is estimated by a sliding mode observer, the sliding mode observer module containing a first order low-pass filter for back electromotive force estimation.

8. The electric machine according to claim 1, further comprising a control module configured to automatically calculate a phase lag compensation value based on rotational speed of the rotor and is applied to feedback increasing accuracy of the field oriented control.

9. The electric machine according to claim 1, further comprising a housing enclosing the stator and rotor, wherein the housing includes a passive cooling mechanism.

10. The electric machine according to claim 1, further comprising the stator teeth each having a generally uniform width, wherein the magnitude of the width is between 60 and 80 percent of the magnitude of a slot pitch.

11. The electric machine according to claim 1, further comprising the rotor having between 8 and 16 poles when the intended rotational speed of the rotor is less than 3000 rpm.

12. The electric machine according to claim 1, further comprising the rotor having between 2 and 12 poles when the intended rotational speed of the rotor is greater than 6000 rpm.

13. An electric machine, comprising:
a rotor, the rotor further including:
having a cylindrical shape and a central axis;
an axial bore adapted to receive a shaft;
an outer circumference adapted to receive a plurality of permanent magnets comprising of permanent magnet material;
a stator, the stator further including:
having a cylindrical shape and a longitudinal axis;
an outer circumference;
a plurality of teeth disposed in an equidistant angular relationship, each tooth projecting inwardly toward the longitudinal axis, the teeth creating a discontinuous inner circumference configured to accept the rotor within the stator such that the longitudinal axis of stator is aligned with the central axis of the rotor and the rotor is rotatable within the inner circumference of the stator;
a stator slot of predetermined shape and size disposed between each tooth and adapted to receive a predetermined number of strands of conducting material to form an electrical winding around at least one tooth;
a current density ranging between 3 and 8 Amp/mm2;
a predetermined number of poles, whereby the number of poles is directly proportional to an electrical frequency of the electric machine and inversely proportional to a number of required coil windings; and
an air gap between the outer circumference of the rotor and the inner circumference of the stator when the rotor is disposed within the stator;
wherein each permanent magnet has a magnetic flux density between 70 and 95 percent of a residual magnetic flux density of the permanent magnet material.

14. The electric machine according to claim 13, further comprising a torque angle between 2 and 10 degrees.

15. The electric machine according to claim 13, further comprising a three phase electrical winding scheme where each phase has two groups and each group includes two coils connected in series.

16. The electric machine according to claim 13, further comprising a sensorless field oriented control, where a rotor angle is estimated by a sliding mode observer, the sliding mode observer module containing a first order low-pass filter for back electromotive force estimation.

17. The electric machine according to claim 13, further comprising a control module configured to automatically calculate a phase lag compensation value based on rotational speed of the rotor and is applied to feedback increasing accuracy of the field oriented control.

18. The electric machine according to claim 13, further comprising the stator teeth each having a generally uniform width, wherein the magnitude of the width is between 60 and 80 percent of the magnitude of a slot pitch.

19. An electric machine, comprising:
a rotor, the rotor further including:
having a cylindrical shape and a central axis;
an axial bore adapted to receive a shaft;
an outer circumference adapted to receive a plurality of permanent magnets comprising of permanent magnet material;
a stator, the stator further including:
having a cylindrical shape and a longitudinal axis;
an outer circumference;
a plurality of teeth disposed in an equidistant angular relationship, each tooth projecting inwardly toward the longitudinal axis, the teeth creating a discontinuous inner circumference configured to accept the rotor within the stator such that the longitudinal axis of stator is aligned with the central axis of the rotor and the rotor is rotatable within the inner circumference of the stator;
a stator slot of predetermined shape and size disposed between each tooth and adapted to receive a predetermined number of strands of conducting material to form an electrical winding around at least one tooth;
a torque angle between 2 and 10 degrees;
a predetermined number of poles, whereby the number of poles is directly proportional to an electrical frequency of the electric machine and inversely proportional to a number of required coil windings; and
an air gap between the outer circumference of the rotor and the inner circumference of the stator when the rotor is disposed within the stator.

* * * * *